Jan. 9, 1940.   R. A. BILTON   2,186,319
ELECTRICAL CONDUCTOR
Filed Nov. 29, 1937
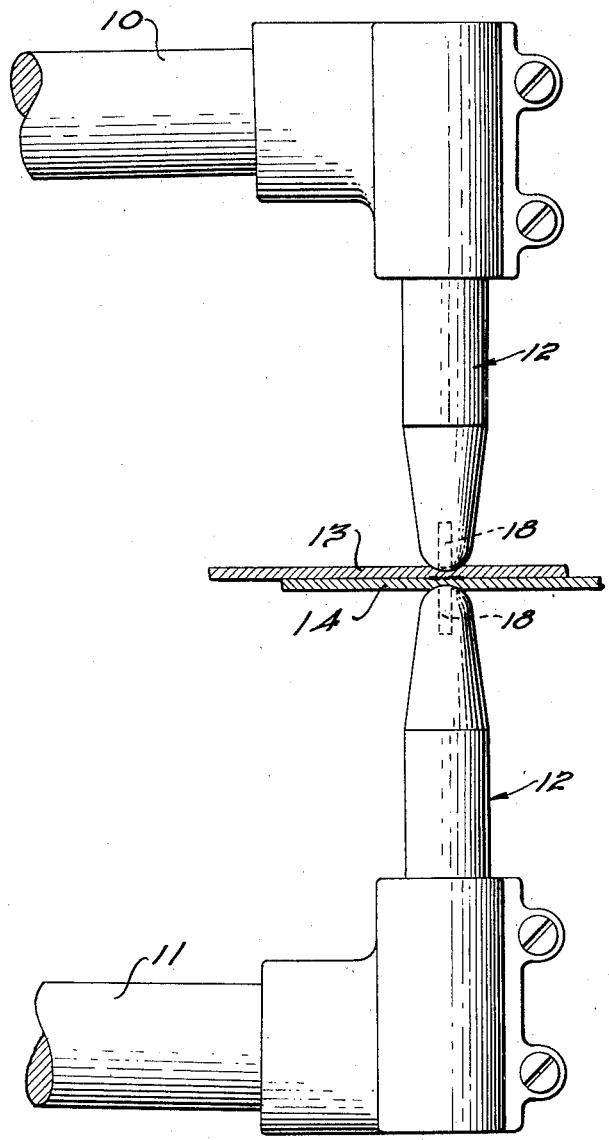
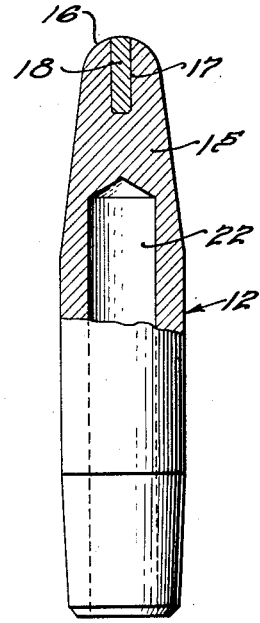
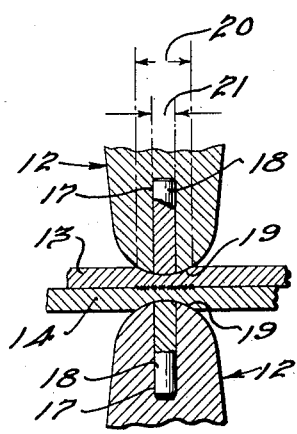
INVENTOR
Robert A. Bilton Patented Jan. 9, 1940

2,186,319

UNITED STATES PATENT OFFICE 2,186,319

ELECTRICAL CONDUCTOR

Robert A. Bilton, Royal Oak, Mich.

Application November 29, 1937, Serial No. 177,070

8 Claims. (Cl. 219—4)

This invention primarily relates to improvements in the art of electrical conductors and refers more particularly to electrode welding tips used in spot welding metal parts, and to other electrical conductors.

It is desirable to provide a welding tip of high electrical conductivity and heretofore copper tips have been used largely by reason of the well known efficiency of copper as a conductor. However, copper welding tips have relatively short life in actual use because of the high temperatures necessarily resulting from the welding operation, such temperature deforming the contact portion of the copper tips to such an extent as to render such relatively soft copper tips unfit soon after use thereof.

Efforts have been made to improve the copper tips by substituting various relatively hard alloys intended to preserve the desired shape of the tip while approximating the conductivity of copper. Tips of this character have been mounted on copper electrodes so as to form the entire welding end portions of the electrodes and in practice the welding surfaces of such tips soon become pitted and flattened or "mushroomed", resulting in such inefficient electrical conduction as to render such tips useless. Efforts to continue use of such tips by increasing the amperage of the welding circuit results in burning the parts to be welded. Such tips must be dressed with great frequency and soon wear away.

It is an object of my invention to overcome the aforesaid difficulties by providing an electrode and more particularly a tip structure therefor which will preserve the desired welding efficiency over long periods of usage, thereby effecting improved economy in the upkeep of welding equipment, minimizing replacement requirements of the electrodes or tips therefor, and improving the quality of the welds over continued operations.

An additional object of my invention is to provide an improved electrode tip capable of being manufactured at relatively low cost, especially in comparison with the alloy tips aforesaid.

My invention is not necessarily limited, in the application of the broader principles thereof, to welding electrodes since it has usefulness in providing improvements in a variety of allied fields such as electrical breakers, switches, and the like, where arcing destroys the breaking points or surfaces of the electrical circuit controlling parts.

Further applications, objects and advantages of my invention will be more apparent from the following illustrative embodiment thereof, reference being made to the accompanying drawing in which, Fig. 1 is a side elevational view of a pair of my welding electrodes positioned for spot welding.

Fig. 2 is a side elevational view of my electrode with a portion thereof broken away to illustrate my improved tip structure.

Fig. 3 is a detail sectional elevational view of the welding end portions of the electrodes as shown in Fig. 1.

I have illustrated my invention in connection with a conventional spot welding device, a portion of which is illustrated in Fig. 1 wherein the cooperating electrical conducting arms or bus bars 10 and 11 each removably mount an electrical conductor or electrode 12. The arms 10 and 11 are brought together in any suitable well known manner in contact with the parts 13 and 14 to be welded, the current then flowing across the electrodes to weld the parts.

My electrode 12 comprises a conductor body portion 15 preferably copper having a tapered welding end portion 16 rounded so that the general contour substantially conforms with standard practice. The end portion is formed with an axial cylindrical cavity or bore 17 into which is inserted a cylindrical core 18 held in the bore by a pressed fit. The outer end of the core 18 is rounded to conform to the general contour of the end portion 16.

This core may be of any material having the desired characteristics of hardness and high electrical conductivity. In practice, and by way of illustration, I have found that a core formed of a material which is well known and readily available on the market is satisfactory in accomplishing the objects of my invention. Such material is an alloy known as elkonite supplied by P. R. Mallory & Company, Inc., and its subsidiary Elkon, Inc., both of Indianapolis, Indiana. Elkonite is an alloy principally of copper with tungsten and molybdenum in sufficient quantity to impart the desired degree of hardness. Only a relatively small quantity of this alloy, or other suitable alloy, is used in my invention because my core forms only a portion of the tip contact area.

During the spot welding operation of the plates 13 and 14, for example, the heat allows the electrode ends to be depressed into the plates generally as illustrated at 19 in Fig. 3. Thus the tip area in contact with the plates, which may be designated as the electrical contact area of the conductor 12, may be represented by a diameter 20 while the electrical contact area of the core may be represented by a diameter 21. It will be noted that the electrical contact area of the core is substantially less than that of the copper body 15 at its end portion 16.

As an example of proportions which I have found to be very desirable for customary size electrodes, the diameter 21 of insert 18 may be about $\frac{3}{32}$ of an inch whereas the diameter 20 will run from $\frac{1}{8}$ to $\frac{1}{4}$ of an inch. Therefore, approximately, the diameter of 20 of the tip contact (neglecting the curved contour) is, in said example, from 2 to 2⅔ times the diameter of the core 18. These general proportions may be varied within the broader aspects of my invention and they are specifically recited as an example of good practice in carrying out my invention. As the diameter 21 is made materially greater relative to the diameter 20, the contact surface of the core 18 becomes objectionally pitted and so deformed as to decrease the efficiency of the current flow between the electrodes and thereby render such tips useless shortly after use thereof. On the other hand, as the diameter 21 is made materially less relative to the diameter 20, the desired quality of the core 18 in preserving the contour surface of the tip of the electrode is lost and the materially greater proportion of copper surface to that of the insert results in a rapid deformation of the tip contact surface.

By reason of my invention wherein the greater part of the tip welding surface is, by preference, copper, and the lesser part is formed by the core insert, the contour of the electrode tip contact surface is preserved for long periods of use while maintaining the welding efficiency. With my invention, the electrode tip need not be dressed and filed away as is required with great frequency with tips used heretofore in order to preserve the contact area. The hard insert 18 maintains the desired original shape of the tip contact area largely because the insert bears the brunt of the actual contact pressure as well as the current.

The body portion 15 may have the customary bore 22 for receiving a circulated cooling fluid such as water. The core insert 18 is extended inwardly of the body in close proximity to the core 22 for cooling the core and end portion 16.

Electrical breakers, switches, and the like, may likewise be provided with my hardened insert as will be readily understood.

I claim:

1. An electrode of the character described adapted for electrical circuit-forming contact, comprising, a conductor body of high electrical conductivity having a contact surface portion thereof, and a conductor member substantially harder than the body and supplementing the contact surface of the body.

2. A spot welding electrode of the character described adapted for electrical circuit-forming contact at one end thereof with a body to be welded, comprising, a body of high electrical conductivity and having an axial core of material having high electrical conductivity, said core material being relatively hard with respect to said conductor body, said conductor body and core together providing the welding contact surface of the electrode, the contact end of the electrode being tapered and the portion of said contact surface provided by said conductor body merging with the portion of said contact surface provided by said core so that said core receives the major portion of the stress incident to initially contacting the electrode with the body to be welded.

3. A spot welding electrode of the character described adapted for electrical circuit-forming contact with a member to be welded, comprising, a conductor body having a tapered end portion adapted for contact with said member, and a reinforcing conductor core for said end portion, said core being disposed at the axis of said end portion, said body and core together providing the welding contact surface of the electrode.

4. A spot welding electrode of the character described, comprising, a longitudinally extending body having a tapered end portion adapted for welding contact, said end portion having an axial cavity opening inwardly of the body, and a reinforcing conductor core disposed in said cavity, said body and core having high electrical conductivity and together providing the welding contact surface of the electrode.

5. A spot welding electrode of the character described having a rounded end portion adapted for electrical circuit-forming contact with a member to be welded, said electrode comprising, a metallic body of high electrical conductivity and having a reinforcing conductor core, of metal substantially harder than said body and of high electrical conductivity, said body and core together providing the rounded welding contact surface of the conductor, said body contact surface increasing in contact area with said member as the latter softens during welding thereof.

6. A spot welding electrode of the character described having a rounded end portion adapted for electrical circuit-forming contact with a member to be welded, said electrode comprising, a copper conductor body having a reinforcing core, of metal substantially harder than said body and of electrical conductivity approximating that of said body, said body and core together providing the rounded welding contact surface of the conductor, said body contact surface increasing in contact area with said member as the latter softens during welding thereof, said core being disposed axially of the electrode to receive the major portion of the impact incident to initial contact of the electrode with said member.

7. An electrode of the character described adapted for electrical circuit-forming contact, comprising, a conductor body of high electrical conductivity having a contact surface portion thereof, and a conductor member of metal substantially harder than said body and of electrical conductivity approximating that of said body, said member supplementing the contact surface of the body, the conductor body comprising the major portion of the total contact surface of the conductor member and body.

8. A spot welding electrode of the character described adapted for electrical circuit-forming contact with a member to be welded, comprising, a conductor body of copper having a tapered end portion adapted for contact with said member, and a reinforcing core of copper tungsten alloy for said end portion, said core being disposed at the axis of said end portion, said body and core together providing the welding contact surface of the electrode, the conductor body comprising the major portion of the total contact surface.

ROBERT A. BILTON.